(12) United States Patent
Gielniewski et al.

(10) Patent No.: US 9,980,510 B2
(45) Date of Patent: May 29, 2018

(54) DEVICE FOR SUPPORTING A MASS FLOW OF ROD-SHAPED ARTICLES OF THE TOBACCO INDUSTRY IN A TRANSPORT CHANNEL AND A METHOD OF FILLING AND EMPTYING THE TRANSPORT CHANNEL

(71) Applicant: International Tobacco Machinery Poland Sp. z o. o., Radom (PL)

(72) Inventors: Adam Gielniewski, Radom (PL); Bartosz Filipek, Radom (PL)

(73) Assignee: INTERNATIONAL TOBACCO MACHINERY POLAND SP. Z O. O., Radom (PL)

( * ) Notice: Subject to any disclaimer, the term of this patent is extended or adjusted under 35 U.S.C. 154(b) by 1 day.

(21) Appl. No.: 15/132,269

(22) Filed: Apr. 19, 2016

(65) Prior Publication Data
US 2016/0302473 A1  Oct. 20, 2016

(30) Foreign Application Priority Data

Apr. 20, 2015  (PL) .......................... 412007

(51) Int. Cl.
*B65G 1/00*  (2006.01)
*A24C 5/47*  (2006.01)
(Continued)

(52) U.S. Cl.
CPC ................ *A24C 5/478* (2013.01); *A24C 5/35* (2013.01); *B08B 9/0436* (2013.01); *B65G 45/10* (2013.01); *B65G 2201/0226* (2013.01)

(58) Field of Classification Search
CPC ..................................................... A24C 5/35
(Continued)

(56) References Cited

U.S. PATENT DOCUMENTS 4,078,648 A * 3/1978 Hinchcliffe .............. A24C 5/35
                                                    198/347.3
5,316,122 A   5/1994 Taddia et al.
(Continued)

FOREIGN PATENT DOCUMENTS

CA       2530932 A    6/2007
DE    10106614 C1    5/2002
(Continued)

OTHER PUBLICATIONS

Polish Patent Office Search Report for PL412007, dated Mar. 25, 2016.
(Continued)

*Primary Examiner* — Gene O Crawford
*Assistant Examiner* — Lester Rushin, III
(74) *Attorney, Agent, or Firm* — Oppedahl Patent Law Firm LLC

(57) ABSTRACT

The subject of the application is a device which supports mass flow of rod-shaped articles of the tobacco industry in a transport channel, having at least two segments (2, 3) connected by a connecting element (4), characterised in that the segments (2) are provided with positioning means (7, 8) which mate with the elements of the conveyor to set the position of the supporting device relative to the elements of the conveyor (5a, 5b). Furthermore, the subject of the application is a method of supporting mass flow of rod-shaped articles of the tobacco industry in a transport channel section characterised in that a supporting device (1) is introduced into the transport channel in the inlet part of the section being filled up provided with positioning means (7, 8) which with the elements of the conveyor set the position of the supporting device relative to the elements of the conveyor belt (5a, 5b), subsequently, the mass flow of rod-shaped articles is started in such a way so that the face
(Continued)

of the mass flow is supported on the last segment of the supporting device, after which the travel of the belt of the conveyor in the remaining part of the section of the transport channel being filled up is started such that the mass flow of rod-shaped articles fills up the space of the channel section, supported on the last segment of the supporting device.

6 Claims, 4 Drawing Sheets

(51) Int. Cl.
    *A24C 5/35*     (2006.01)
    *B65G 45/10*     (2006.01)
    *B08B 9/043*     (2006.01)

(58) Field of Classification Search
    USPC .............................. 198/347.1, 347.2, 347.3
    See application file for complete search history.

(56) References Cited

U.S. PATENT DOCUMENTS

| | | | |
|---|---|---|---|
| 7,168,551 B2* | 1/2007 | Spatafora | B65G 47/5113 131/282 |
| 8,042,676 B2* | 10/2011 | Balk | B65G 47/5131 198/347.1 |
| 2003/0116168 A1 | 6/2003 | Spatafora | |
| 2015/0047137 A1 | 2/2015 | Gielniewski | |

FOREIGN PATENT DOCUMENTS

| | | | |
|---|---|---|---|
| DE | 10255572 A1 * | 6/2004 | ............. F16L 55/30 |
| EP | 1712141 A2 | 10/2006 | |
| JP | 2005-512556 A | 5/2005 | |
| WO | 2011136670 A1 | 11/2011 | |
| WO | 2011136670 A | 2/2015 | |

OTHER PUBLICATIONS

English translation of Polish Patent Office Search Report for PL412007, dated Mar. 25, 2016.
European Search Report for EP 16163836, dated Aug. 19, 2016.
Office Action for Japan Patent Office counterpart application No. 2016-083795, dated Apr. 21, 2017.
Machine translation of Office Action for Japan Patent Office counterpart application No. 2016-083795, dated Apr. 21, 2017.

* cited by examiner

DEVICE FOR SUPPORTING A MASS FLOW OF ROD-SHAPED ARTICLES OF THE TOBACCO INDUSTRY IN A TRANSPORT CHANNEL AND A METHOD OF FILLING AND EMPTYING THE TRANSPORT CHANNEL

The subject of the invention is a device for supporting a mass flow of rod-shaped articles of the tobacco industry in a transport channel and a method of filling and emptying the transport channel.

BACKGROUND

A problem in tobacco industry systems operation is efficient and effective filling and emptying transport channels. Transport channels for the mass flow of products such as cigarettes, filter rods, cigars or cigarillos are often very extensive and, additionally, they run in different directions, also vertically, above work stations and transport routes for operators using the said stations. Filling the channels with and emptying them of the rod-shaped articles is troublesome due to the need to maintain the articles tightly in the channel in the area of the beginning and the end of the flow of articles and prevent the articles from spilling in the conveyor.

Usually the practice is to support the beginning and end of the mass flow in a tobacco industry system by means of a spongy element. Also, it is required to clean the transport channels each time before the change of brand of the manufactured products. The introduction of this operation is necessary from the manufacturing process viewpoint, since all products from the preceding production need to be removed.

A standard solution of the prior art is to stop the production system, manually or automatically introduce into the system's channel a multi-segment device made of, for instance, sponge, which fills the channel in its cross-section, and then start the system while keeping visual track of the device along it. Subsequently, the system is stopped once again and the device is removed at its other end or in the receiving station.

A drawback of this prior art solution becomes evident during the filling of vertical channels or those of a complex shape. Multi-segment devices either get stuck when going through sharp bends of a transport channel, slide down in the vertical channels where a channel gets wider and the device loses support from one of the walls, do not ensure proper tightness of the channel in its cross-section, which causes coming out of the rod-shaped articles above the device and filling up of the channel with unwanted material, or fall down when passing through horizontal curves.

Prior art already includes multi-segment devices used in the transport channels of communication routes which transport rod-shaped articles.

From the international patent application WO 2011/136670, a multi-segment device made entirely of an elastic material is known. This device is introduced into and removed from the channel by means of an automatic docking station. A drawback of such a solution are longitudinal and transverse movements relative to the conveyor.

In the European patent application EP 1 712 141 A2, a cleaning device has been described which is made of connected links made of a material with the same physical properties which is send through transport channels. The device's design makes it possible to send it through the channels at an angle of 90° whereby the cleaning and guiding elements are made of dimensionally stable and elastic plastic foam. A drawback of such a solution are longitudinal and transverse movements relative to the conveyor.

In the U.S. Pat. No. 5,316,122, a slide has been described which is guided in the transport channels. The slide is guided by means of conveyors and has the shape of an oblong rectangle when looking from the top. According to the patent, the slide is made of links connected by spherical connectors in such a way so that it can tilt in relation to the plane of the transport channel as well as perpendicularly to this plane. Such a design does not ensure sufficient tightness of a transport channel when the face or tail of the mass flow is supported, neither does it provide protection against slide movement relative to the conveyor.

SUMMARY OF THE INVENTION

The gist of the invention is a supporting device which supports the mass flow of rod-shaped articles of the tobacco industry in the transport channel, having at least two segments connected by a connecting means, characterised in that the segments are equipped with positioning means which mate with the elements of the conveyor to set a position of the supporting device relative to the elements of the conveyor.

Furthermore, the device according to the invention is characterised in that the positioning means include the first positioning means which set the position of the supporting device in the conveying direction of the conveyor.

Furthermore, the device according to the invention is characterised in that the first positioning means, which set the position in the direction of conveying, have projections, placed on the external surface of the segment, which mesh with the conveyor's recesses, setting the position of the supporting device in the conveying direction.

Furthermore, the device according to the invention is characterised in that the positioning means include the second positioning means which set the position of the supporting device in a transverse direction to the conveying direction.

Furthermore, the device according to the invention is characterised in that the second positioning means, which set the position in the transverse direction, include at least two sets of retainers placed at opposite side edges of the segment.

Furthermore, the device according to the invention is characterised in that the assembly of side retainers comprising a series of oval rings mounted on a common axle, the axle is placed in the cut-out in the body of the stiff segment, the rings having a much larger internal diameter than the diameter of the axle and a smaller external diameter than the width of the cut-out such that when the supporting device is placed on the conveyor, the rings, which project beyond the outline of the conveyor, drop under the force of gravity, enclosing the sides of the elements of the conveyor and setting the position of the supporting device in the transverse direction.

Moreover, the gist of the invention is the method of filling a transport channel with rod-shaped articles of the tobacco industry in the section of a transport channel. The method according to the invention is characterised in that a supporting device provided with positioning means which mate with the elements of the conveyor to set a position of the supporting device relative to the elements of the conveyor is introduced into the transport channel in the inlet part of the section being filled up. Subsequently, the mass flow of rod-shaped articles is started in such a way so that the face of the mass flow is supported on the last segment of the supporting device, after which the travel of the elements of the conveyor in the remaining part of the section of the transport channel being filled up is started such that the mass flow of rod-shaped articles fills up the space of the channel section, supported on the last segment of the supporting device.

Furthermore, the method of emptying a transport channel with rod-shaped articles of the tobacco industry in the transport channel section is characterised in that a supporting device provided with positioning means which mate with elements of the conveyor to set a position of the supporting device relative to the elements of the conveyor is introduced into the transport channel in the end part of the section being filled up in such a way that the tail of the mass flow is supported on the first segment of the supporting device. Subsequently the travel of the belt of the conveyor in the other part of the section of the transport channel is started so that the mass flow of rod-shaped articles leaves the space of the channel section, supported on the first segment of the supporting device.

Thanks to the positioning means used, the device according to the invention stably adheres to the walls of the transport channel which prevents transverse and longitudinal movements relative to the conveyor and sliding down in vertical channels. Also, it is possible to guide the device through channels of a complex shape. In addition, the wall adherence effect significantly improves maintaining the tightness in the area of adhering the device to the channel, especially when transporting articles in vertical channels. Furthermore, the use of an element which connects elements with two-dimensional degrees of freedom has made the introduction of the device into the channels significantly easier and eliminated its twisting about the longitudinal axis.

DESCRIPTION OF THE DRAWING

The advantageous embodiment of the subject of the invention has been shown in greater detail in the following figures whereby.

DETAILED DESCRIPTION

Figure 1:
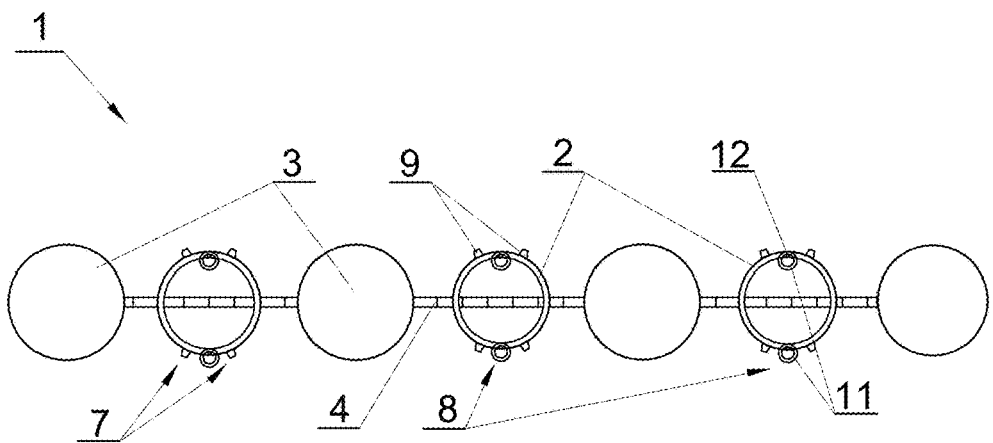
FIG. 1 shows a side view of the device according to the invention.

FIG. 1 shows a side view of the first embodiment of a device which supports the mass flow. The device (1) consists of segments (2, 3) connected with each other by means of a common connecting element (4), i.e. a chain. In this embodiment, the segment (2) is made mainly of plastic and has the form of a pipe section which runs transversally to the direction of conveying (T). However, the segment (2) may just as well be made of other material, e.g. wood, metal, textile, rubber or sponge. An advantage of a chain used as a connecting element (4) of the device (1) is that it connects the segments (2, 3) and, in principle, bends in two planes. Thanks to this, it is much easier to insert it into the transport channel (6), it does not twist about its own longitudinal axis and maintains stable position on the conveyor. The connecting element (4), which connects the segments (2, 3), may also be made of, for instance, a rope or other material serving similar functions.

The external surface of the segments (2) has been equipped, in the contact points with working surfaces of the conveyor, with at least one positioning means (7) which sets the position in the direction of conveying (T) and which has the form of a projection (9). Further, it meshes with the recesses (10) of the conveyor (5a, 5b), which can be seen in other figures, setting the position of the supporting device in the direction of conveying (T). An expert in the field will easily notice that the projections (9) may be replaced with other elements protruding from the external surface of the segment (2), such as positioning teeth which are placed transversally to the direction of conveying (T) and can mesh with the elements of the conveyor.

Moreover, the segment (2) has been equipped with positioning means (8) placed within the area of the edge of the segment (2) so that, after the device (1) has been positioned on the conveyor (5a, 5b), they adhere to the side surface of the conveyor (14) and set the position of the supporting device (1) in a transverse direction to the direction of conveying (T).

Figure 2:
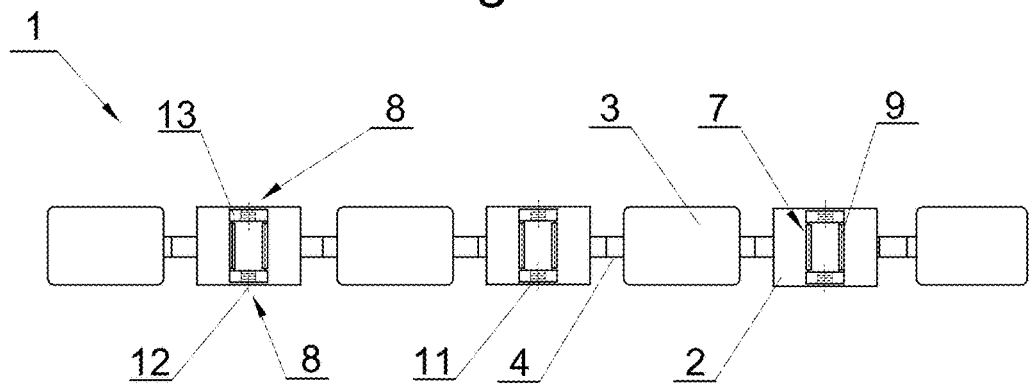
FIG. 2 shows a top view of the device according to the invention.

FIG. 2 shows a top view of the supporting device (1) where the segments (2, 3), which are connected by means of the connecting element (4), can be seen. The side positioning means (8) consists of a series of oval rings (11) mounted on a common axle (12) in the cut-out (13) located on the body of the segment (2), at its side edges. In principle, the positioning means (7) in the form of projections (9) are placed transversally to the direction of conveying (T) on the external surface of the segment (2). In the case when it becomes necessary to increase the stability of the device (1) and increase the resistance in the direction of conveying, e.g. when supporting heavier rod-shaped articles (15) in vertical channels, the positioning means (7) may also be placed on the external surface of the segments (3) so as to mate with the working surface of the conveyors (5a, 5b). A similar effect may also be achieved by increasing the length of the device and introducing further segments (2, 3). In the course of developing the structure of the device, particularly good results have been achieved with devices having five segments.

Figure 3:
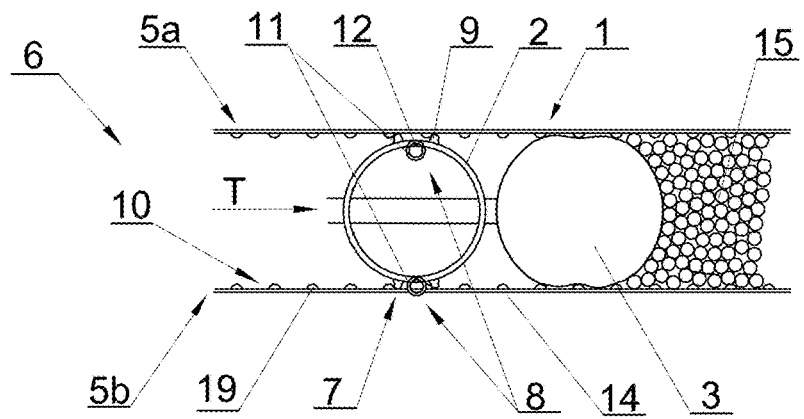
FIG. 3 shows the device according to the invention in a horizontal transport channel during the process of emptying the channel of the mass flow of rod-shaped articles.

FIG. 3. shows the principle of operation of the supporting device (1) in a horizontal channel (6). The mass flow of rod-shaped articles (15), conveyed in the horizontal transport channel (6) in the direction of conveying (T), is supported from the end side by means of an extreme segment (3) of the supporting device (1). The segment (3) has a slightly larger dimension than the distance between the two working surfaces of the conveyor (5a, 5b) and is made of a highly elastic material such as, e.g. sponge or rubber. Thanks to this, it puts pressure on the working surfaces of the conveyor (5a, 5b) while passing through the transport channel (6) and it is a supporting element for the whole device (1). Additionally, it is located tightly in the transport channel (6) and prevents the rod-shaped articles of a production batch from being left behind in the channel, when the batch is about to come to an end, and mixed with the next production batch of rod-shaped articles (15), e.g. having other manufacturing process properties. On the segment (2), the positioning means (7) have been placed which can also have the form of projecting pins, plates or other elements working together with the recesses (10) on the working surface of the conveyor (5a, 5b) in order to prevent the movement of the device (1) in the transport channel (6) in the direction of conveying (T).

Figures 4A, 4B, 4C:
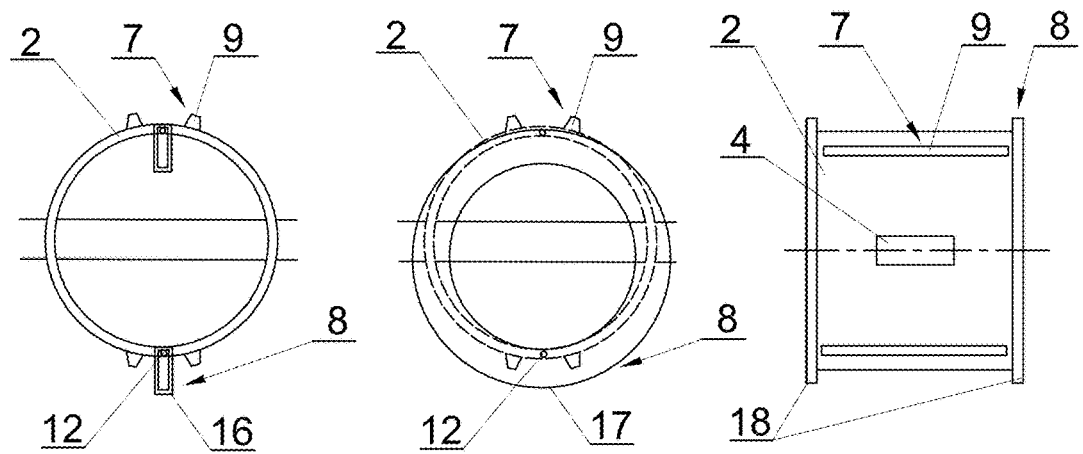
FIG. 4a shows a segment of the device according to the invention in the second embodiment.
FIG. 4b shows a segment of the device according to the invention in the third embodiment.
FIG. 4c shows a segment of the device according to the invention in the fourth embodiment.

Moreover, the segment (2) contains the positioning means (8), which can have the form of oval rings (11) loosely mounted on the axle (12), as shown in, e.g. FIG. 3, albeit the same effect will be achieved by introducing the element (16) (shown in FIG. 4a), loosely mounted on the axle (12), which, under the force of gravity, will drop to such a position that it will prevent the movement of segments in a transverse direction relative to a belt or a chain of the conveyor, or the large ring (17) mounted off centre (shown in FIG. 4b). It is also possible to make the segment (2) with a fixed positioning means (8), in the form of a flange (18) on the external edges, whose front view is shown in FIG. 4c. In this embodiment of the invention, the segment (2) is equipped with a flange (18) which, while the segment (2) is in contact with the working surface of the conveyor (5a, 5b), will also enclose the sides of the conveyor (14) such that the flange (18) will prevent transverse movement of the supporting device (1) relative to the conveyor.

Figures 5A, 5B:
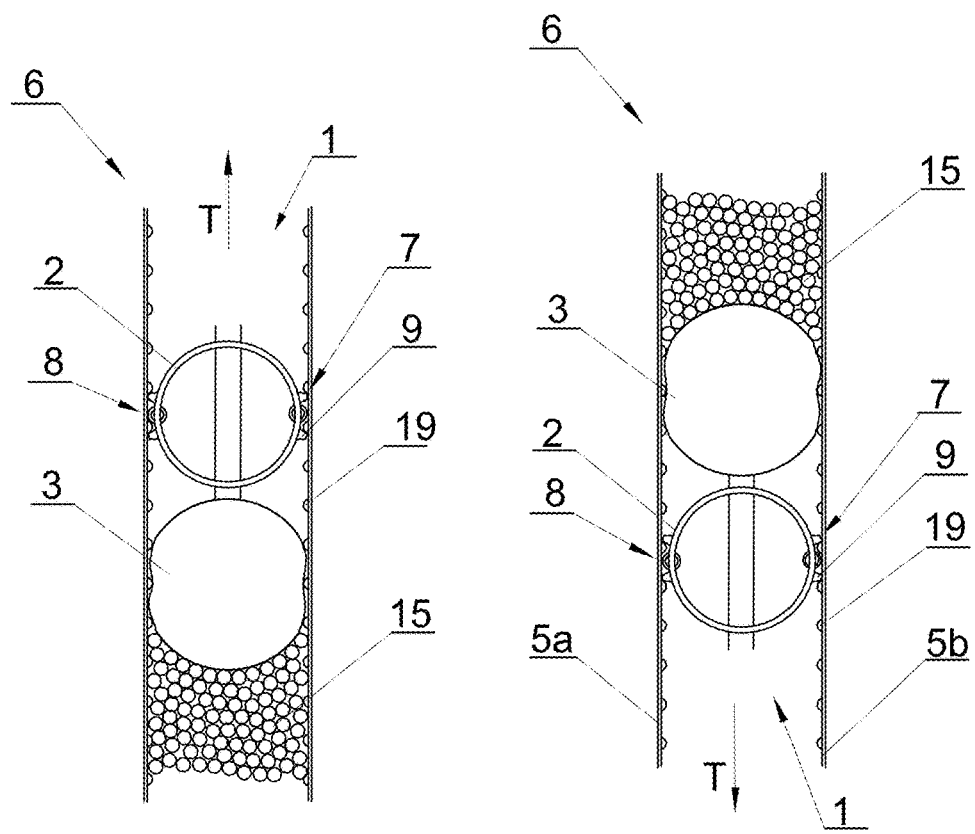
FIG. 5a shows the device according to the invention in a vertical transport channel during the process of filling the channel with the mass flow of rod-shaped articles.
FIG. 5b shows the device according to the invention in a vertical transport channel during the process of emptying the channel of the mass flow of rod-shaped articles.

FIGS. 5a and 5b show embodiments analogous to the embodiment shown in FIG. 3.

FIG. 5a shows the supporting device (1) placed in a vertical transport channel (6) which is being filled up with rod-shaped articles (15) conveyed from the bottom up in the direction of conveying (T) in the mass flow. The extreme segment (3) of the device (1) supports and forms the face of the mass flow in such a manner so as to prevent undesirable spilling of the articles (15) in the channel (6). The positioning means (7) enter the recesses (10) located on the working surface of the conveyor (5a, 5b) and brace against the projections (19), which protrude from the surface, preventing the movement of the device in the direction of conveying (T). FIG. 5b shows the supporting device (1) placed in a vertical transport channel (6) which is being filled up with rod-shaped articles (15) conveyed from the top to bottom in the direction of conveying (T) in the mass flow. The extreme segment (3) of the device (1) supports and forms the tail of the mass flow in such a manner so as to prevent undesirable spilling of the articles (15) and ensure complete emptying of the transport channel (6).

Figure 6A:
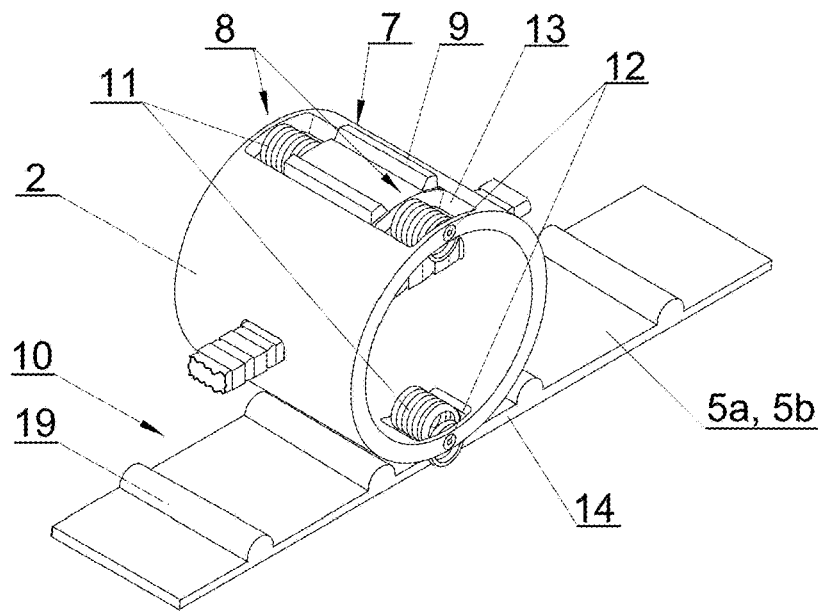
FIG. 6a shows a perspective view of the device according to the invention in the first embodiment.

FIG. 6a shows a perspective view of the segment (2) on the conveyor (5a, 5b) where the principle of operation of the positioning means (8), in the form of oval rings (11) mounted on an axle (12), can be seen whereby the axle (12) is placed in the cut-out (13) in the body of the stiff segment (2), the oval rings (11) having a much larger internal diameter than the diameter of the axle (12) and a smaller external diameter than the width of the cut-out (13) such that when the supporting device is placed on the conveyor (5a, 5b), the oval rings (11), which project beyond the outline of the conveyor (5a, 5b), drop under the force of gravity, enclosing the sides of the belt of the conveyor (14) and setting the position of the supporting device (1) in the lateral direction.

Figure 6B:
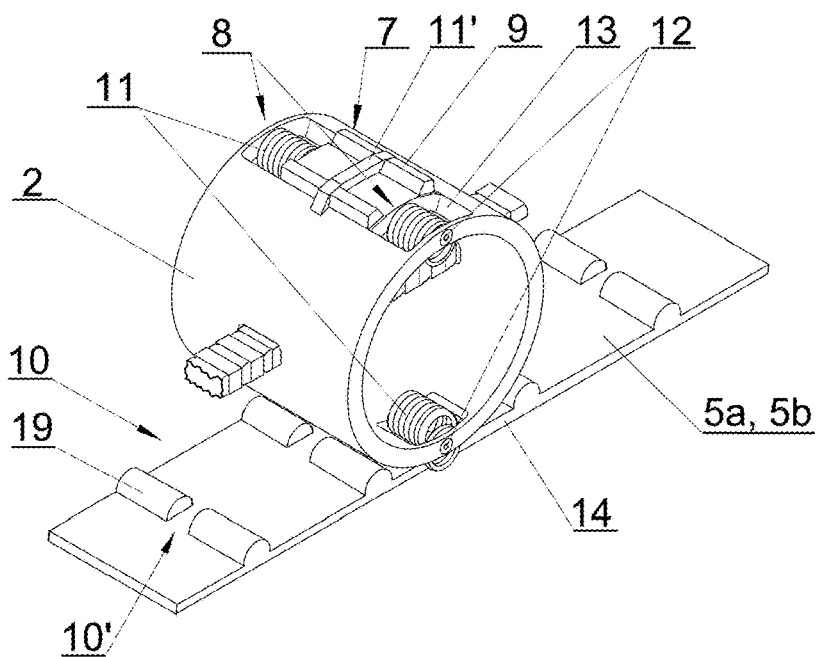
FIG. 6b shows a perspective view of the device according to the invention in the second embodiment.
Figure 7:
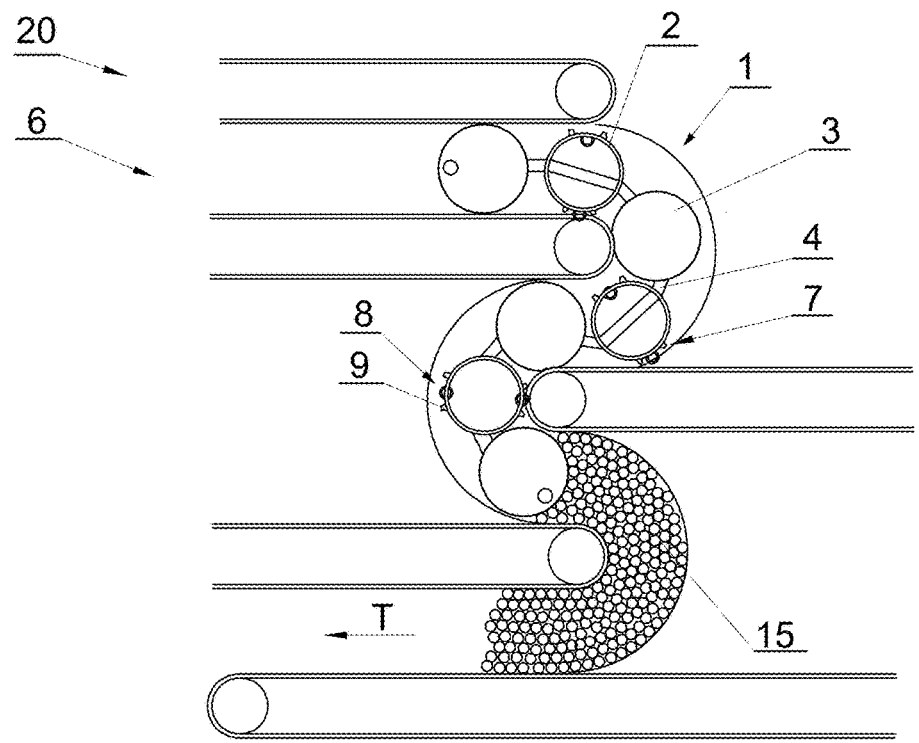
FIG. 7 shows a side view of the device according to the invention which assists in the process of emptying a complex series of conveyors.

FIG. 6b shows a perspective view of the segment (2) on the conveyor (5a, 5b) in the second embodiment. An additional positioning means (8) in the form of a projection (11'), which has been positioned longitudinally to the direction of conveying, is located on the external surface of the segment (2). The longitudinal projection (11') of the segment (2) enters the recess (10') located on the surface of the conveyor belt (5a, 5b). In such a position, identically to the oval ring (11), it will prevent the movement of the supporting device (1) in a transverse direction relative to the conveyor. The number and shape of the longitudinal projections (11') on the segments' external surface can be freely changed. However, they must mate together with the recesses (10') located on the conveyor (5a, 5b). FIG. 7 shows the supporting device (1) placed in a transport channel (6) of a storage device (20) during the emptying of the channel (6) of rod-shaped articles (15) from the top down in the direction of conveying (T). The connecting element (4), which connects the segments (2, 3), has been made from a chain and enables smooth performance of movements in the direction of the transport channels located at different heights of the storage device (20). The positioning means (7, 8) prevent movement in the channel (6) in the direction of conveying (T), uncontrollable pressure on the rod-shaped articles by the extreme segment (3), shift in the direction transverse to the conveyor and falling out of the device (1) from the channel (6).

Figure 8:
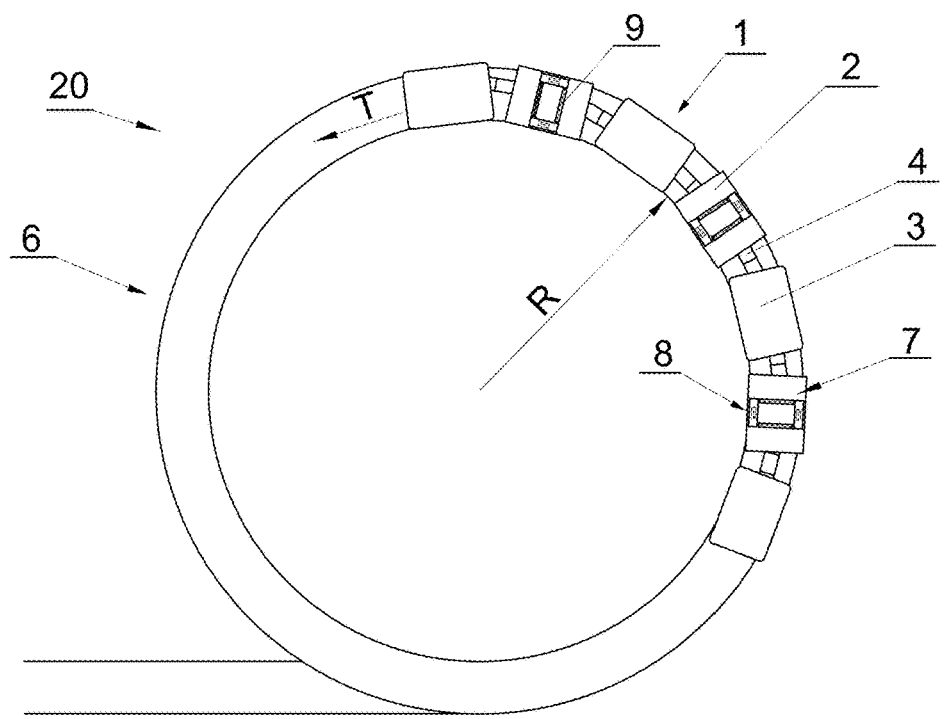
FIG. 8 shows a top view of the device according to the invention in a storage device.

FIG. 8 shows a top view of the supporting device (1) placed in a transport channel (6) of a storage device (20) which moves in the direction of conveying (T). The chain used as a connecting element (4) enables smooth passage through bends in transport channels of radius (R). The positioning means (7, 8) prevent from moving in the channel (6) in the direction of conveying (T) and shifting in the direction transverse to the conveyor. It prevents the device (1) from falling out of the channel (6).

The invention claimed is:

1. A device for supporting a mass flow of rod-shaped articles of the tobacco industry on a conveyor which includes
    at least two segments (2, 3) connected by a non-rigid connecting element (4)
    characterised in that
       the segments (2) are provided with a first positioning means (8) which mesh with elements of the conveyor to set a position of the supporting device relative to the elements of the conveyor (5a, 5b), while
       the first positioning means (8) set the position of the supporting device in relation to the conveyor in a transverse direction to the conveying direction,
       the first position means (8) comprising
       at least two sets of retainers placed at the opposite side edges of the segment (2), which set the position of the supporting device in the transverse direction.

2. The device according to claim 1, further comprising a second positioning means (7) which set the position of the supporting device in the conveying direction of the conveyor (5a, 5b).

3. The device according to claim 2 wherein the second positioning means (7), which set the position in the direction of conveying, have projections (9), placed on the external surface of the segment (2), which mesh with recesses (10) on the conveyor (5a, 5b), setting the position of the supporting device in the conveying direction.

4. The device according to claim 1 wherein the sets of side retainers (8) further comprise:
- a series of rings (11) mounted on a common axle (12),
- the axle (12) placed in a cut-out (13) in the body of the segment (2),
- the rings (11) having a much larger internal diameter than the diameter of the axle (12) and a smaller external diameter than the width of the cut-out (13) so that when the supporting device is placed on the conveyor (5a, 5b), the rings, which project beyond the outline of the conveyor (5a, 5b), drop under the force of gravity, enclosing the sides of the elements the conveyor (14) and setting the position of the supporting device in the transverse direction.

5. A method of filling a transport channel with rod-shaped articles of the tobacco industry characterised by the following steps
- placing a supporting device (1) on the conveyor into an inlet part of the section being filled up, and providing the supporting device (1) with positioning means (7, 8) which mesh with the elements of the conveyor to set a position of the supporting device relative to the elements of the conveyor belt (5a, 5b), wherein positioning means (7,8) comprise a first positioning means (7) which set the position of the supporting device in the conveying direction of the conveyer (5a, 5b) and a second positioning means including at least two sets of retainers placed at the opposite side edges of the segment (2), which set the position of the supporting device in the transverse direction, subsequently starting mass flow of rod-shaped articles in such a way that the front face of the mass flow is supported on the last segment of the supporting device, after which
- the travelling of elements of the conveyor in the other part of the section of the transport channel being filled up is starting, so that the mass flow of rod-shaped articles fills up the space of the channel section, supported on the last segment of the supporting device.

6. A method of emptying a transport channel filled with rod-shaped articles of the tobacco industry characterised by the following steps
- placing a supporting device (1) on the conveyor in an outlet part of the section being filled up in such a way that the tail of the mass flow is supported on the first segment of the supporting device, and providing the supporting device (1) with positioning means (7, 8) which mesh with the elements of the conveyor to set a position of the supporting device relative to the elements of the conveyor (5a, 5b), wherein positioning means (7,8) comprise a first positioning means (7) which set the position of the supporting device in the conveying direction of the conveyer (5a, 5b) and a second positioning means including at least two sets of retainers placed at the opposite side edges of the segment (2), which set the position of the supporting device in the transverse direction, subsequently
- the travelling of elements of the conveyor in the other part of the section of the transport channel is starting so that the mass flow of rod-shaped articles exits the space of the channel section, supported on the first segment of the supporting device.

\* \* \* \* \*